US006644144B2

(12) United States Patent
Bédard

(10) Patent No.: US 6,644,144 B2
(45) Date of Patent: Nov. 11, 2003

(54) ROTATABLY MOUNTED THROTTLE ASSEMBLY

(75) Inventor: Yvon Bédard, Orford-Lac Bowker (CA)

(73) Assignee: Bombardier Inc., Valcourt (CA)

( * ) Notice: Subject to any disclaimer, the term of this patent is extended or adjusted under 35 U.S.C. 154(b) by 52 days.

(21) Appl. No.: 09/944,390

(22) Filed: Sep. 4, 2001

(65) Prior Publication Data

US 2002/0026849 A1 Mar. 7, 2002

Related U.S. Application Data

(60) Provisional application No. 60/230,431, filed on Sep. 6, 2000.

(51) Int. Cl.[7] .............................................. B62K 21/26
(52) U.S. Cl. ........................ 74/551.9; 74/502.2; 74/488
(58) Field of Search .............................. 74/484 R, 485, 74/486, 487, 488, 489, 551.1–551.9, 502.2, 504, 510, 511 R

(56) References Cited

U.S. PATENT DOCUMENTS 2,776,579 A * 1/1957 Nichel, Jr. .................. 74/488
4,186,291 A * 1/1980 Swanson ................. 200/61.86
4,232,565 A * 11/1980 Leonheart .................... 74/489
4,352,303 A * 10/1982 Christner ..................... 74/489
4,471,209 A * 9/1984 Hollander .................. 219/204
4,799,668 A * 1/1989 Jansen ......................... 482/57
4,899,610 A * 2/1990 Bourret ....................... 74/489
5,370,017 A * 12/1994 Krauer ...................... 74/502.2
5,461,936 A * 10/1995 Bulkeley ..................... 74/489
5,802,927 A * 9/1998 Yu et al. .................... 74/502.2

* cited by examiner

*Primary Examiner*—William C Joyce
*Assistant Examiner*—Timothy McAnulty
(74) *Attorney, Agent, or Firm*—Pillsbury Winthrop LLP

(57) ABSTRACT

A throttle assembly for a tracked vehicle comprises a tube rotatably mounted on a steering member of the vehicle. A throttle housing is mounted on the tube. A throttle lever has a proximal end and a distal end and is pivotally mounted on the throttle housing. The throttle lever is pivotable about the distal end of the throttle lever on the throttle housing. A biasing element provides a biasing force to the tube. The biasing element is connected to the steering member.

13 Claims, 6 Drawing Sheets

ROTATABLY MOUNTED THROTTLE ASSEMBLY

This patent claims benefit of Provisional No. 60/230,431 filed Sep. 6, 2000.

FIELD OF THE INVENTION

The present invention relates to snowmobiles and more particularly to snowmobile throttle assemblies.

BACKGROUND OF THE INVENTION

Snowmobile throttle assemblies are widely used to regulate the speed of snowmobiles so that the snowmobile driver can push a throttle lever of a throttle assembly to increase the speed of the snowmobile. Conventionally, a throttle assembly is fixedly attached to a steering member of the snowmobile near the handle grip, and the throttle lever of the assembly is pivotally mounted so that it hinges about a rotational axis in response to the driver's pushing or releasing of the throttle lever.

With these conventional throttle assemblies, the driver uses his or her thumb over the throttle lever with an over-the-handle grip during a ride in a substantially straightforward direction. In sharp turns, however, the driver switches to an under-the-handle grip as the driver tends to lean heavily in a lateral direction in the direction of the turn, sometimes resulting in the driver sliding his or her body almost off the seat of the snowmobile.

In maneuvering such sharp turns on the snowmobiles currently on the market, the driver must rotate his or her hand around the handle to the under-the-handle grip, and use his or her index finger and/or middle finger to pull the throttle lever to maintain or increase the speed of the snowmobile, as illustrated in FIG. 6. This is so because during sharp turns, the driver's hand and arm may be positioned at such a severe angle with respect to one another as the driver turns the steering member and leans heavily in a lateral direction. Such positioning creates stress at the wrist and would be uncomfortable to the driver as the angle of the turn increases. Further, since the wrist can bend only so far, the driver has to switch to the under-the-handle grip to continue pushing the throttle lever.

Heretofore, all snowmobiles had a fixedly mounted throttle assembly, which required the above-described over-the-handle grip to under-the-handle grip changes during sharp turns. Further, during extended rides, the driver's hand is in a fixed position while exerting enough pressure to push the throttle lever to regulate the speed of the snowmobile. Maintaining the same hand position for long periods of time can become tiresome for the driver.

SUMMARY OF THE INVENTION

Therefore, it is an object of the present invention to provide a novel throttle assembly for a snowmobile which provides its driver more comfort than throttle assemblies heretofore available. This objective is attained by providing a rotatably mounted throttle assembly for a snowmobile. According to an aspect of the present invention, a throttle assembly comprises a tube rotatably mounted on a steering member of the snowmobile. A throttle housing is mounted on the tube. A throttle lever has a proximal end and a distal end. The throttle lever is mounted on the throttle housing and is pivotable about the distal end of the throttle lever on the throttle housing. A biasing element provides a biasing force to the tube and is connected to the steering member.

According to another aspect of the present invention, a throttle assembly for a tracked vehicle has a tube rotatably mounted on a steering member of the vehicle. A biasing element biases the tube to a first position. The biasing element is connected to the steering member. A throttle has a proximal end and a distal end. The throttle is coupled to the tube and is pivotable about the distal end of the throttle on the tube. The throttle assembly is rotatably movable relative to the steering member to a second position against the biasing of the biasing element.

These and other objects, features, and advantages of this invention will become apparent from the following detailed description when taken in conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF AN EXEMPLARY EMBODIMENT OF THE PRESENT INVENTION

Figure 1:
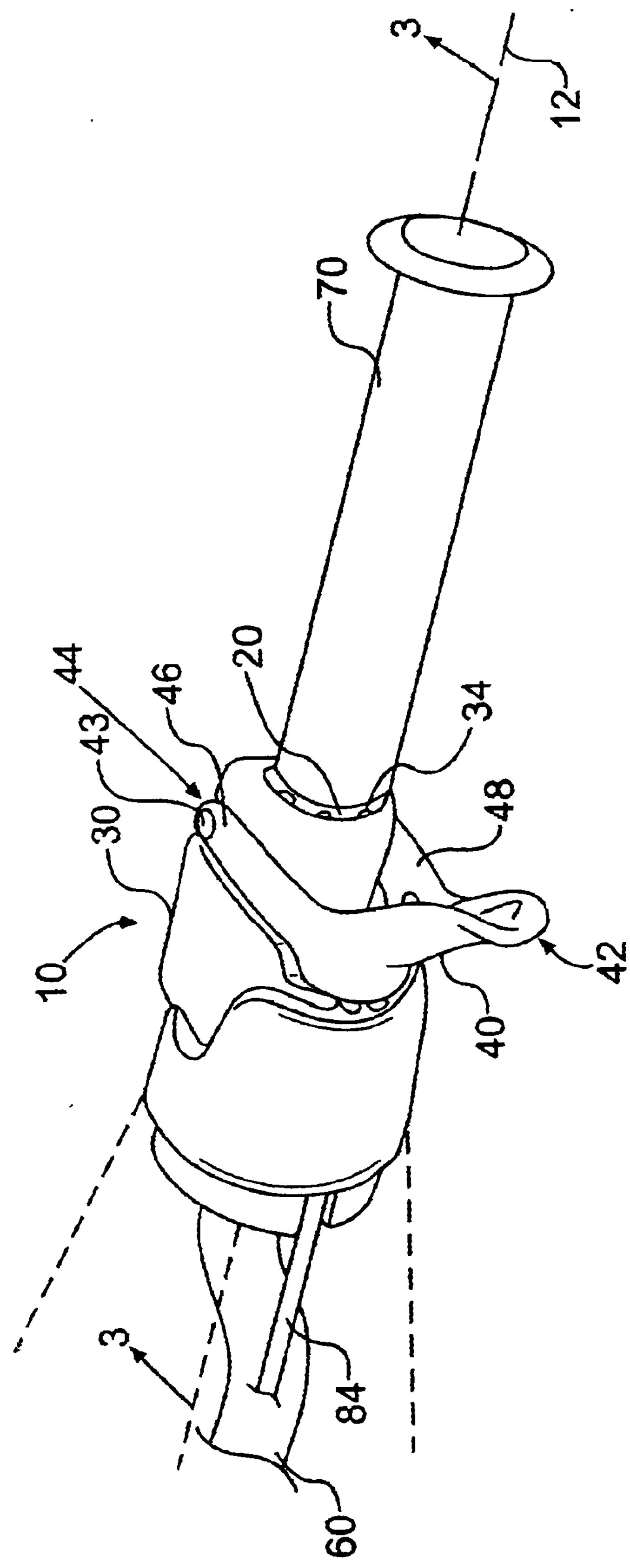
FIG. 1 is a perspective view of a throttle assembly rotatably mounted to a steering member of a tracked vehicle according to the principles of the present invention.

FIGS. 1–5 show a throttle assembly 10, which throttle assembly 10 embodies the principles of the present invention. The main components of the throttle assembly 10 are a tube 20, a throttle housing 30, a throttle lever 40, and a biasing element 50.

FIG. 1 shows a tube 20 that is rotatably mounted on a steering member 60 of a tracked vehicle (the overall vehicle not shown), such as a snowmobile. The steering member 60, or also referred to as a handle bar, is the manually engageable component of a steering assembly of the tracked vehicle, which steering member 60 is moved in a steering manner by the driver seated on the tracked vehicle to control the direction of movement. The tube 20 is constructed of steel, but may be constructed of any other substantially rigid material such as plastic or aluminum. The clearance between the tube 20 and the steering member 60 should be sufficient to avoid jamming. The preferred range of clearance is between 0.5 to 1 mm, but can be modified by one of ordinary skill in the art.

Figure 2:
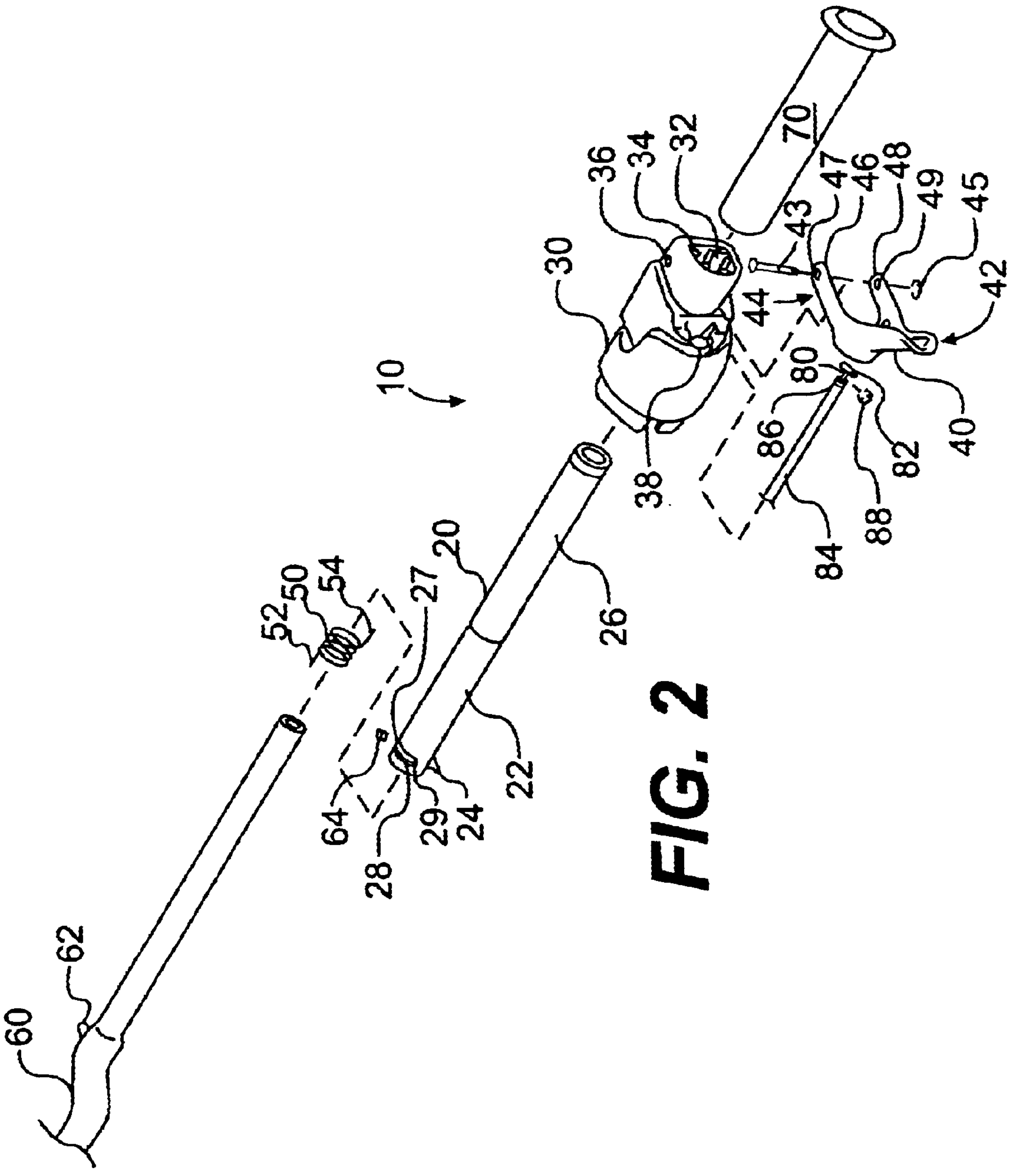
FIG. 2 is a perspective view showing the components of the throttle assembly and steering member of FIG. 1 before being assembled.

In FIG. 2, the components of the throttle assembly and the steering member before their assembly are illustrated. The tube 20 has a slot 28, which slot 28 is configured and positioned to receive a pin 64 connected to the steering member 60. The slot 28 permits a predetermined length of rotational movement of the tube 20 relative to the steering member 60. The slot 28 also functions to prevent the tube 20 from moving longitudinally with respect to the steering member 60.

The throttle housing 30 is securely mounted on an end portion 22 of the tube 20. Specifically, the throttle housing 30 has a central opening 32 therethrough. A plurality of tube engaging structures 34 extend into the central opening 32 and forcibly engage the tube 20 when the tube 20 is inserted therethrough to inhibit removal thereof. A fastener (not shown), such as a screw, is inserted through the throttle housing 30 and into the tube 20 to further inhibit any pivotal or longitudinal movement of the throttle housing 30 with respect to the tube 20. The throttle housing 30 further includes a pivot pin opening 36 and a cable opening 38.

Figure 4:
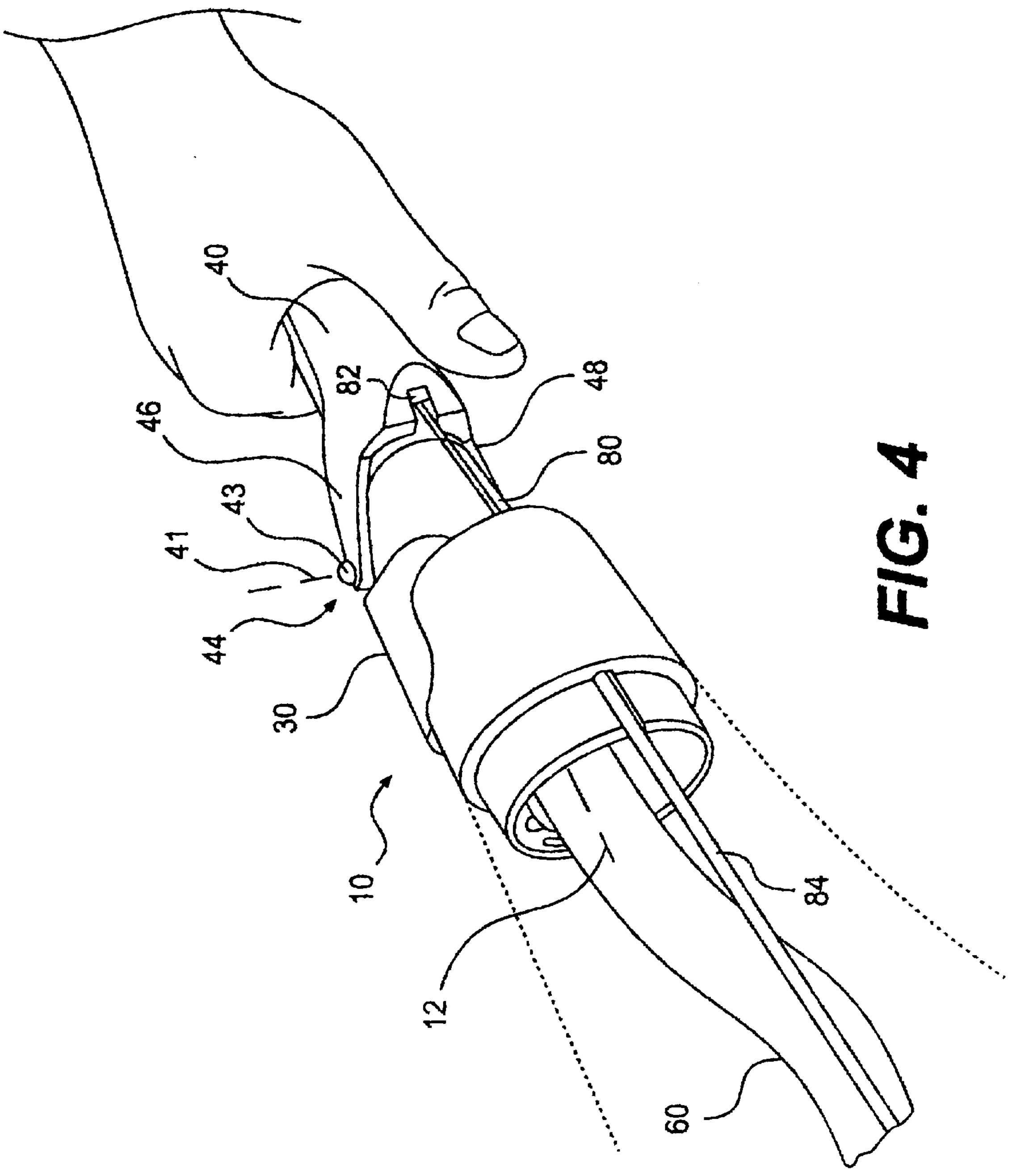
FIG. 4 is a perspective view showing the positioning of a driver's hand on the throttle assembly of FIG. 1 during a ride in a substantially straightforward direction.
Figure 5:
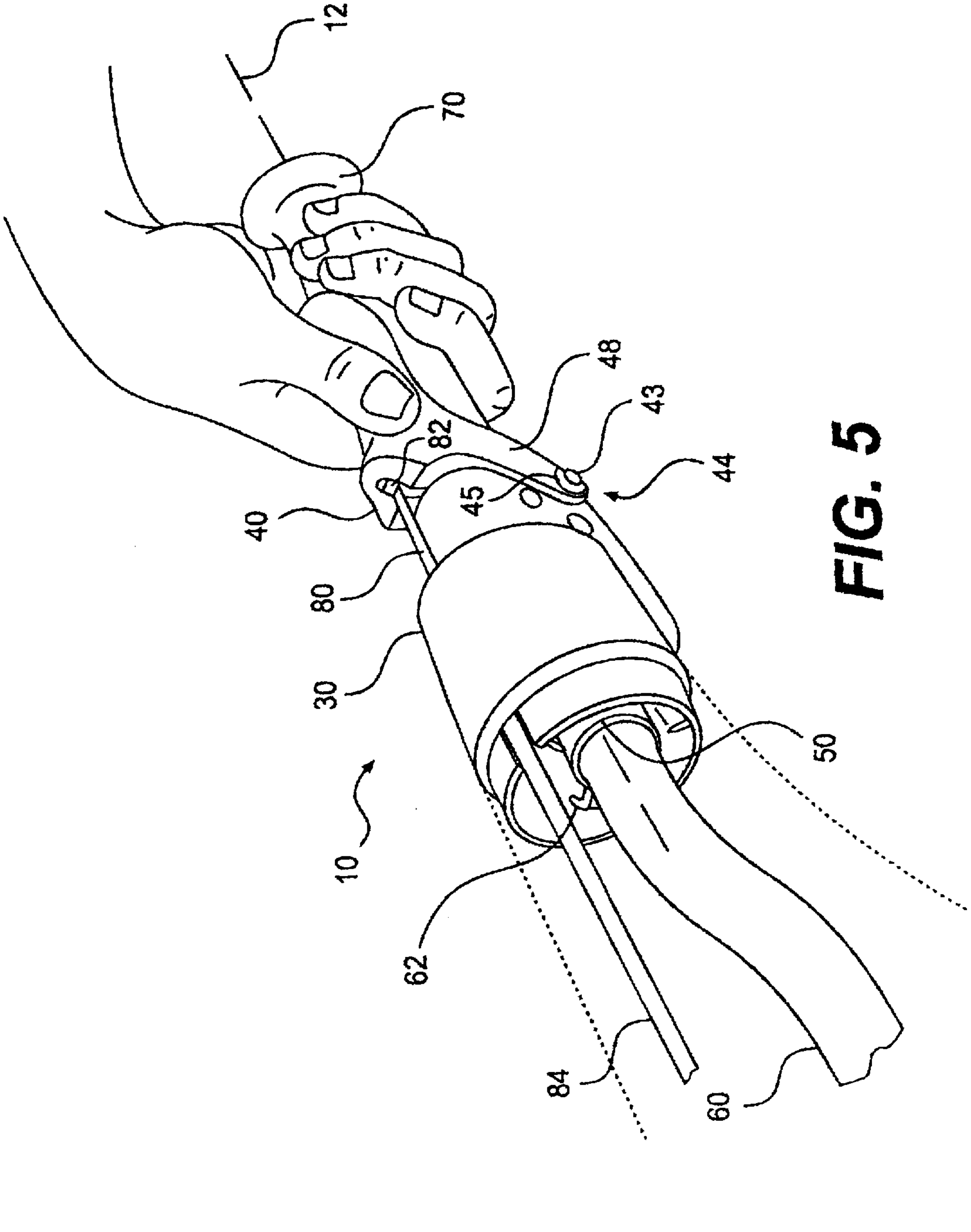
FIG. 5 is a perspective view showing the positioning of a driver's hand on the throttle assembly of FIG. 1 during a sharp turn with the throttle assembly at a rotated position with respect to the steering member.

The throttle lever 40 is pivotally mounted on the throttle housing 30, such that the throttle lever 40 pivots relative to the throttle housing 30 about a pivot axis 41 between a rest position, as shown in FIG. 1, and a pivoted position, as shown in FIGS. 4 and 5. Specifically, the throttle lever 40 has a proximal end 42 and a distal end 44. The throttle lever 40 has a pair of arm members 46, 48 at its distal end 44 with aligned holes 47, 49 through end portions of the arm members 46, 48 thereof. The arm members 46, 48 are positioned on the throttle housing 30 such that the holes 47, 49 and the pivot pin opening 36 are aligned. Then, a pivot pin 43 is inserted through the holes 47, 49 and the pivot pin opening 36. The pivot pin 43 is secured with a c-clip 45. As a result, the throttle lever 40 pivots with respect to the throttle housing 30 about the pivot pin 43, which defines the pivot axis 41.

The throttle lever 40 is operatively connected to a carburetor of the tracked vehicle by a cable 80 to regulate the speed of the tracked vehicle. Specifically, the cable 80 has a t-shaped end member 82 which connects to the throttle level 40 with a snap action. An opposite end of the cable 80, which is connected to the carburetor, is linked with a throttle spring to bias the throttle lever 40 to the rest position (FIG. 1). The cable 80 is inserted through a sheath member 84. One end of the sheath member 84 has a grooved end member 86 which is inserted through cable opening 38 of the throttle housing 30 and secured thereto with a c-clip 88. The opposite end of the sheath member 84 extends a predetermined distance from the throttle housing 30. Thus, when the throttle lever 40 is pivoted to the pivoted position (as shown in FIGS. 4 and 5) against the biasing of the throttle spring, the throttle lever 40 pulls the cable 80, which cable 80 moves relative to the sheath member 84 and actuates the carburetor.

Figure 3:
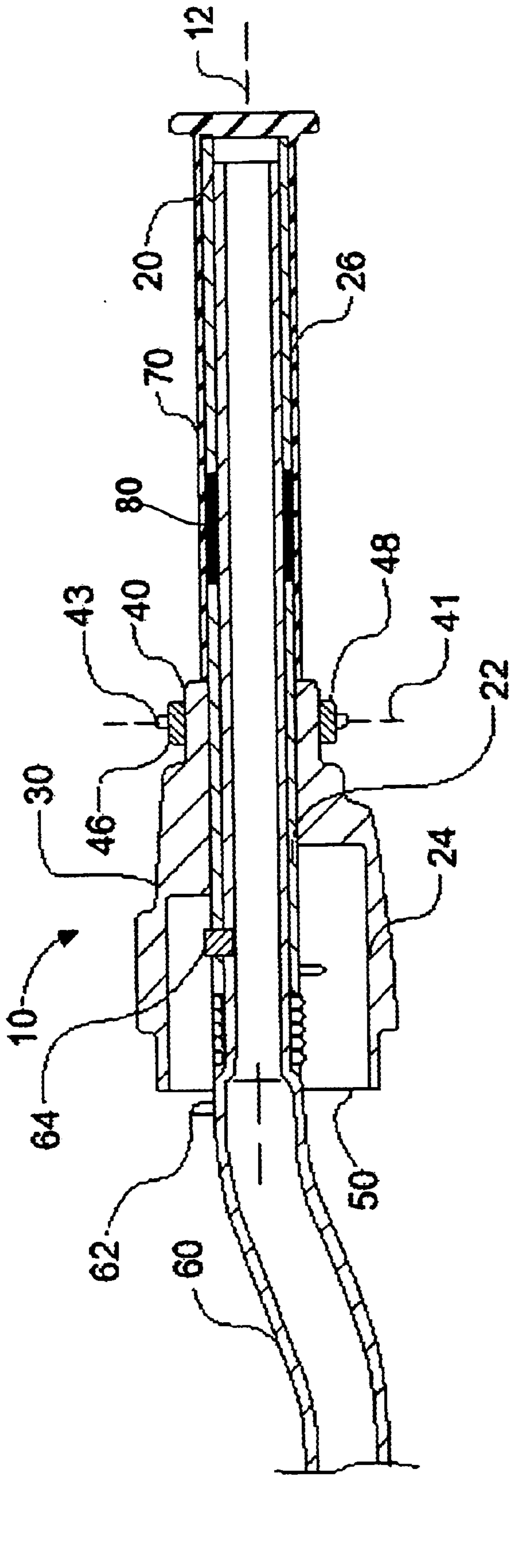
FIG. 3 is a cross-sectional view of along line 3—3 of FIG. 1.

The biasing element 50, in the form of a coil spring, provides a biasing force to the tube 20. As shown in FIG. 3, the biasing element 50 extends about the steering member 60. One end 52 of the biasing element 50 is connected to a hook member 62 on the steering member 60. An opposite end 54 of the biasing element 50 is connected to a hook member 24 on the end portion 22 of the tube 20. It is contemplated that one end 52 of the biasing element 50 is inserted into a notch on the steering member 60 and the opposite end 54 is inserted into a corresponding notch on the tube 20.

A gripping member 70, preferably made of rubber, is mounted on an end portion 26 of the tube 20, opposite the end portion 22. A heating element 80 may be positioned between the tube 20 and the gripping member 70 to warm the hands of the driver during a ride.

The tube 20, and hence the throttle assembly 10, is rotatably movable about an axis 12 between a first position, as shown in FIG. 4 and a second position, as shown in FIG. 5. The throttle assembly 10 is biased to the first position by the biasing element 50 and is rotatably movable relative to the steering member 60 to the second position against the biasing of the biasing element 50.

Specifically, the biasing element 50 applies a biasing force to the tube 20 to maintain one end 27 of the slot 28 in engagement with the pin 64 so as to maintain the tube 20, and hence the throttle assembly 10, in the first position thereof. An opposite end 29 of the slot 28 serves a maximum second position, or front stop, rotatably offset from the first position. However, in operation, the coiling action of the biasing element 50 about the steering member 60 acts as a front stop as the biasing element 50 can only coil so much before it entirely surrounds the steering member 60 and further coiling is prevented. Thus, the slot 28 permits one way rotation of the throttle assembly 10.

Figure 6:
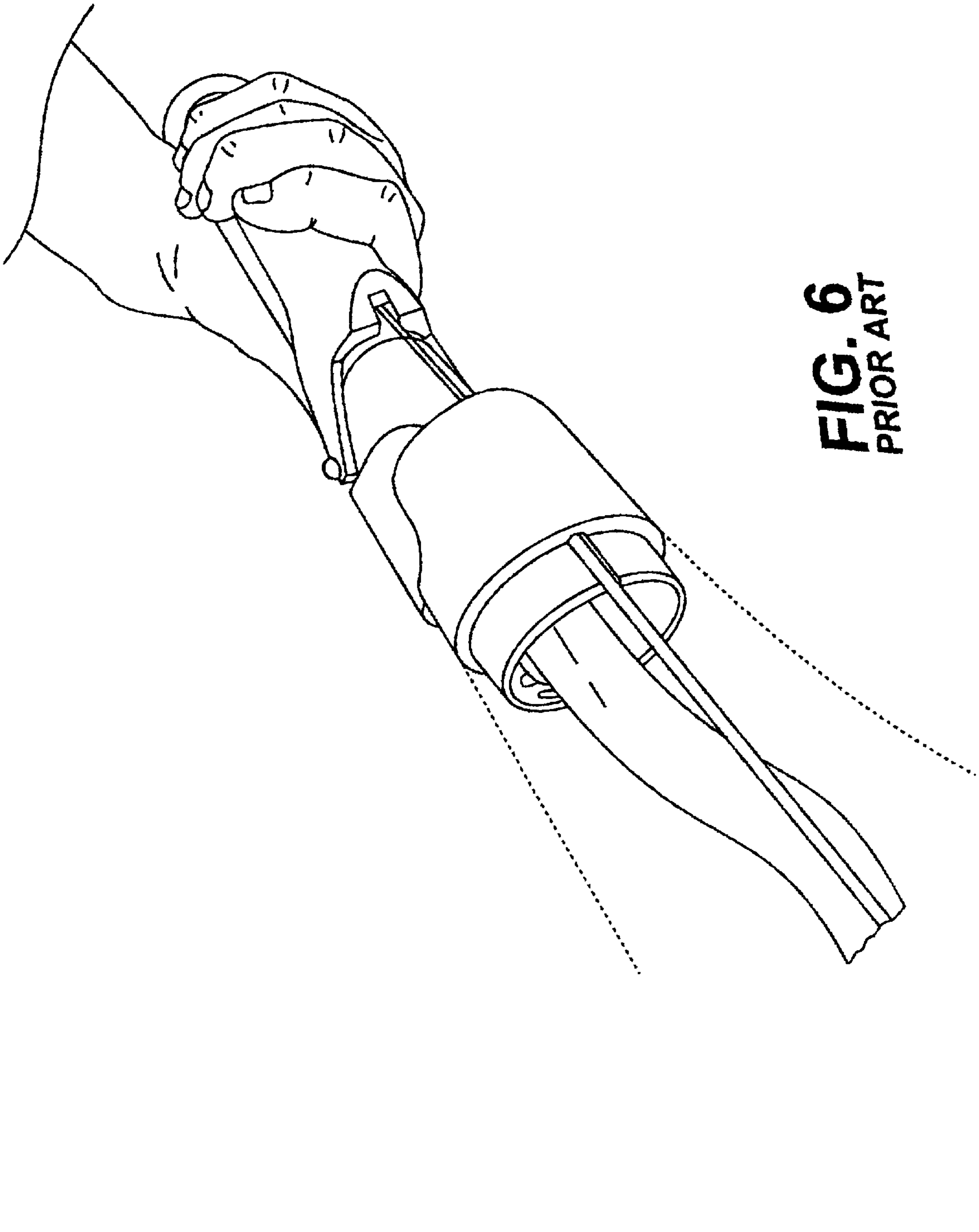
FIG. 6 PRIOR ART
FIG. 6 is a perspective view showing the positioning of a driver's hand on a prior art throttle assembly during a sharp turn with the hand moved to an under-the-handle grip.

An advantage of the present invention is that the rotatable mounting of the throttle assembly 10 allows a driver of the tracked vehicle to maintain the same position of his/her hand in relation to the throttle lever 40 during both straightforward riding and turning of the tracked vehicle, as appreciated from FIGS. 4–5. In other words, the driver can continue to use his/her thumb to pivot the throttle lever 40 and not have to change grip as his/her body position changes during turning. The throttle assembly 10 will rotate from the first position to the second position during turns, which enables the driver to maintain the same grip. The changing of hand positions was required by prior art fixedly mounted throttle assemblies, as described in the background section and shown in FIG. 6.

Another advantage of the present invention is to reduce stress on the hand of the driver generated by an extended ride. When the throttle assembly is mounted in the conventional manner, the driver's hand is in a fixed position while exerting enough pressure to push the throttle lever. Maintaining the same hand position for a long period of time can be tiresome for the driver. By providing a rotatably mounted throttle assembly, the present invention allows the driver to vary the positioning of the hand with respect to the throttle assembly, thereby reducing the stress on the hand.

Further, different drivers require different grip positions. For example, some drivers may be located closer to the steering member than others. In other examples, some snowmobiles, such as touring type sleds with passengers, may require the driver to move closer to the steering member. The rotatably mounted throttle assembly 10 allows adjustment of the driver's grip position without having to adjust the mounting of throttle assembly or steering column as in the prior art.

The specification and figures have indicated that the throttle lever 40 is to be pushed or pulled by the driver's thumb. However, the throttle lever 40 may also be pushed or pulled by the index finger and/or by the index and middle fingers. The rotatable mounting of the throttle assembly 10 enables the driver to maintain whatever grip is most comfortable.

It can thus be appreciated that the objectives of the present invention have been fully and effectively accomplished. The foregoing specific embodiments have been provided to illustrate the structural and functional principles of the present invention and is not intended to be limiting. In particular, the specific details of the throttle housing, the shape of the lever, biasing elements, gripping member and means to securely fasten, etc. can be readily modified without departing from the spirit of the present invention. To the contrary, the present invention is intended to encompass all modifications, alterations, and substitutions within the spirit and scope of the appended claims.

What is claimed:

1. A throttle assembly for a tracked vehicle, said throttle assembly comprising:

a tube rotatably mounted on a steering member of said vehicle;

a throttle housing mounted on said tube;

a throttle lever having a proximal end and a distal end;

said throttle lever pivotally mounted on said throttle housing and pivotable about the distal end of said throttle lever on said throttle housing; and a biasing element providing a biasing force to said tube, the biasing element being connected to and engaging said steering member.

2. A throttle assembly according to claim 1, wherein said throttle lever is operatively connected to a carburetor of said vehicle to regulate speed of said vehicle.

3. A throttle assembly according to claim 1, further comprising a gripping member mounted on said tube.

4. A throttle assembly according to claim 3, further comprising a heating element positioned between said tube and said gripping member.

5. A throttle assembly according to claim 1, wherein said biasing element is a coil spring.

6. A throttle assembly according to claim 1, wherein said tube has a slot configured and positioned to receive a pin connected to said steering member, said slot permitting a predetermined length of rotational movement of said throttle assembly relative to said steering member.

7. A throttle assembly for a tracked vehicle, said throttle assembly comprising:

a tube rotatably mounted on a steering member of said vehicle;

a biasing element biasing said tube to a first position; said biasing element connected to and engaging said steering member;

a throttle having a proximal end and a distal end, said throttle pivotally coupled to said tube and pivotable about the distal end of said throttle on said tube;

wherein said throttle assembly being rotatably movable relative to said steering member to a second position against the biasing of said biasing element.

8. A throttle assembly according to claim 7, wherein said throttle lever is operatively connected to a carburetor of said vehicle to regulate speed of said vehicle.

9. A throttle assembly according to claim 7, further comprising a gripping member mounted on said tube.

10. A throttle assembly according to claim 9, further comprising a heating element positioned between said tube and said gripping member.

11. A throttle assembly according to claim 7, wherein said biasing element is a coil spring.

12. A throttle assembly according to claim 7, wherein said tube has a slot configured and positioned to receive a pin connected to said steering member, said slot permitting a predetermined length of rotational movement of said throttle assembly relative to said steering member.

13. A throttle assembly according to claim 12, wherein one end of said slot engages with said pin under biasing from said biasing element indicating the first position and another end of said slot functions as a maximum second position rotatably offset from the first position.

* * * * *